US006658195B1

United States Patent
Senshu et al.

(10) Patent No.: US 6,658,195 B1
(45) Date of Patent: Dec. 2, 2003

(54) MAGNETIC RECORDING AND PLAYBACK METHOD AND APPARATUS

(75) Inventors: Yoichiro Senshu, Kanagawa (JP); Shuichi Oota, Saitama (JP); Takuji Himeno, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/537,317

(22) Filed: Mar. 29, 2000

(30) Foreign Application Priority Data

Mar. 31, 1999 (JP) .......................................... P11-090721

(51) Int. Cl.⁷ ................................................ H04N 5/93
(52) U.S. Cl. ............................ 386/54; 386/96; 386/104
(58) Field of Search ............................ 386/46, 54, 96, 386/98, 103, 104, 112, 124

(56) References Cited

U.S. PATENT DOCUMENTS 5,513,010 A * 4/1996 Kori et al. .................. 386/104
5,574,570 A * 11/1996 Ohkuma et al. ............ 386/103
5,659,654 A * 8/1997 Nagasawa et al. .......... 386/120

* cited by examiner

Primary Examiner—Huy Nguyen
(74) Attorney, Agent, or Firm—Frommer Lawrence & Haug LLP; Wiliam S. Frommer

(57) ABSTRACT

The ratio of an inter-track gap occupied in each track of a magnetic tape is minimized to increase the amount of effective data which can be recorded on one track. In the magnetic recording and playback method for recording digital data on a magnetic tape by a helical scan method and for playing back digital data recorded on a magnetic tape by a helical scan method, in sequence from the start of each track on a magnetic tape, a first recording area containing an audio sector, etc., and a second recording area containing an insert-and-track-information sector, one of a video sector and an audio-video-mixed sector in which audio data and the video data are mixed, a subcode sector, etc., are located, with an inter-track gap provided between the recording areas, and data is continuously recorded on each sector of the first recording area and the second recording area, wherein data in the first recording area can be rewritten after recording onto the magnetic tape is terminated.

10 Claims, 4 Drawing Sheets

MAGNETIC RECORDING AND PLAYBACK METHOD AND APPARATUS

BACKGROUND OF THE INVENTION

1. Field of the Invention

The present invention relates to a magnetic recording and playback method and apparatus for recording a digital signal onto magnetic tape and playing back a digital signal therefrom.

2. Description of the Related Art

Recently, portable camera-integrated digital video tape recorders, and desktop digital video tape recorders which record digital video signals and digital audio signals have appeared.

As a recording method for the digital video tape recorder, there is a format which is commonly called the "DV method" (IEC (International Electrotechnical Commission) 61834 helical scan digital video tape cassette recording system using 6.35 mm magnetic tape for consumer use: 525/60, 625/50, 1125/60, and 1250/50 systems). In this DV method, the width of the video tape used is 6.35 mm (=¼ inch), which is narrower than the tape width of video tape used in other recording methods, for example, the 8 mm method (IEC 60843 helical scan video tape cassette recording system using 8 mm magnetic tape for consumer use) for conventional analog video tape recorders.

Also, in the DV method, in spite of the fact that the tape width is narrower than that of a conventional tape, signals to be recorded are compressed and the recording density is increased, thereby allowing for higher image quality and for a longer recording time than that in the recording method in conventional analog video tape recorders.

FIG. 4 shows the track structure in the DV method, in which there is provided in sequence from the start of the track, an ITI (Insert and Track Information) sector (ITI), which serves as a time-axis reference during so-called "after-recording", and an audio sector (Audio) via an inter-track gap (ITG) Gap1, and a video sector (Video) via another inter-track gap Gap2, and after that, a subcode sector (Subcode) is provided via another inter-track gap Gap3.

The reason the sections between the sectors are separated by Gap1, Gap2, Gap3, etc., in this manner is to absorb the wobbling of the position of each area due to rotational variation in the head drum, the expansion and shrinkage of tape due to environmental storage conditions, curving of tracks in the direction of the width of the tape, during the so-called "after-recording" in which audio data, etc., is additionally recorded over data which has already been recorded.

However, in the DV method, the ratio of all the inter-track gaps (Gap1, Gap2, and Gap3: a total of 2875 bits) occupied in the effective tracks (134850 bits) is 2% (2875/134850, which is approximately equal to 0.02).

The inter-track gaps Gap1, Gap2, and Gap3 are provided to prevent interference between the sections of an insert-and-track-information sector (ITI), an audio sector (Audio), a video sector (Video), and a subcode sector (Subcode), and are not portions used for actually recording data.

Therefore, if the ratio of the inter-track gaps Gap1, Gap2, and Gap3) occupied in an effective track is decreased so that the tracks are effectively used as portions where data is actually recorded, the efficiency at which the tape can be used is improved.

SUMMARY OF THE INVENTION

In view of the above, an object of the present invention is to minimize the ratio of the inter-track gaps occupied in each track of a magnetic tape so that the amount of effective data which can be recorded on one track is increased.

To achieve the above-mentioned object, according to one aspect of the present invention, there is provided a magnetic recording and playback method for recording digital data on a magnetic tape by a helical scan method and for playing back digital data recorded on a magnetic tape by a helical scan method, the magnetic recording and playback method comprising the steps of: providing in sequence on each track on a magnetic tape a first recording area containing at least an audio sector, and a second recording area containing at least an insert-and-track-information sector, one of a video sector and an audio-video-mixed sector, and a subcode sector, an inter-track gap provided between the recording areas; and recording data continuously on each sector of the first and second recording areas, wherein the data in the first recording area can be rewritten after recording onto the magnetic tape is terminated.

Therefore, since data is written continuously into each sector of the first and second recording areas, wasted portions of each track, which would otherwise not be used for recording data, are reduced, making it possible to improve the efficiency at which a magnetic tape is used.

According to another aspect of the present invention, there is provided a magnetic recording and playback apparatus for recording digital data on a magnetic tape by a helical scan method and for playing back digital data recorded on a magnetic tape by a helical scan method, the magnetic recording and playback apparatus comprising: a unit for providing in sequence on each track on a magnetic tape a first recording area containing at least an audio sector, and a second recording area containing at least an insert-and-track-information sector, one of a video sector and an audio-video-mixed sector, and a subcode sector, an inter-track gap provided between the recording areas; and a recording unit for recording data continuously on each sector of the first and second recording areas, wherein only the data in the first recording area can be rewritten by the recording unit after recording onto the magnetic tape is terminated.

Therefore, since data is written continuously into each sector of the first and second recording areas, wasted portions of each track, which would not be used for recording data, are reduced, making it possible to improve the efficiency at which a magnetic tape is used.

The above and further objects, aspects and novel features of the invention will become more apparent from the following detailed description when read in conjunction with the accompanying drawings.

DESCRIPTION OF THE PREFERRED EMBODIMENTS

Figure 1:
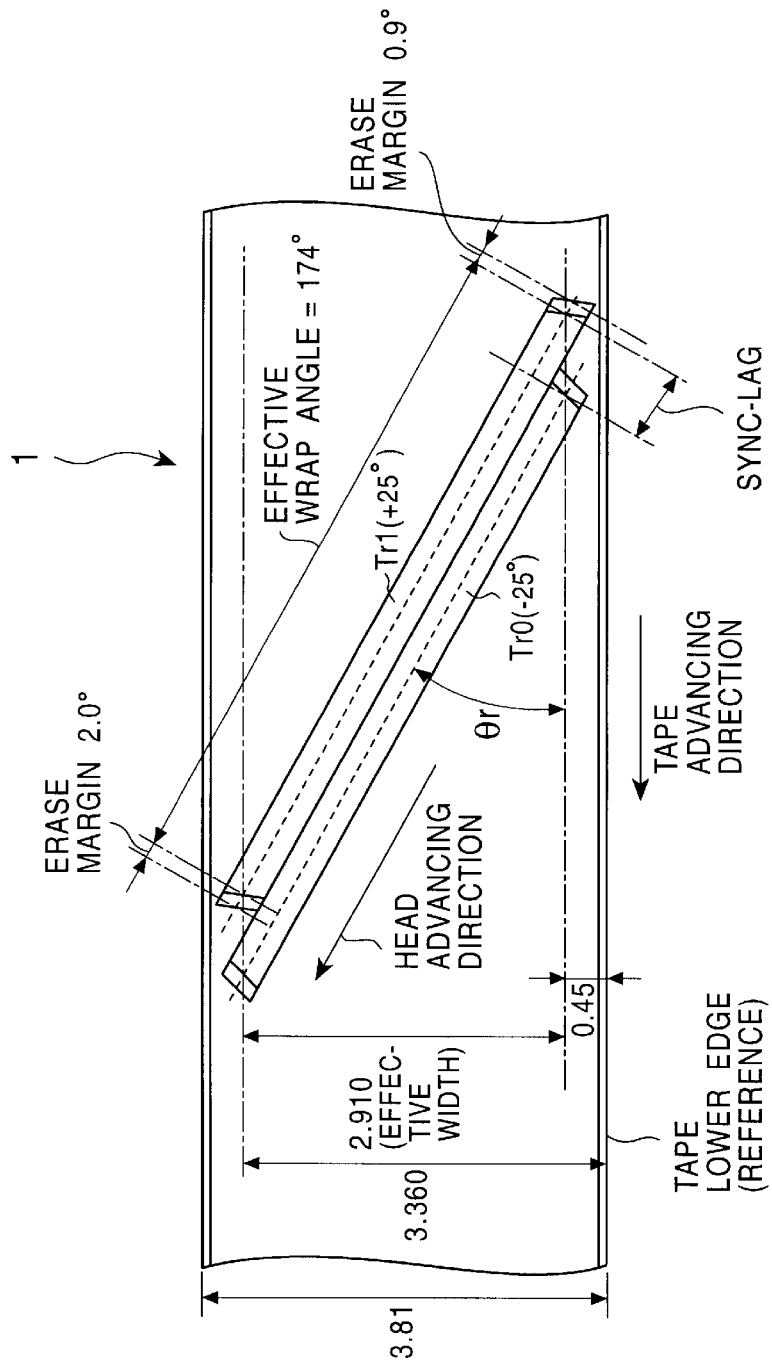
FIG. 1 shows a track pattern on a magnetic tape according to an embodiment of a magnetic recording and playback method and apparatus of the present invention.

Embodiments of a magnetic recording and playback method and an apparatus according to the present invention are described below with reference to the accompanying drawings.

In embodiments described below, the present invention is applied to a magnetic recording and playback method for recording onto and playing back digital data from a magnetic tape having a width of 3.81 mm (=3/20 inches) and to a magnetic recording and playback apparatus employing the magnetic recording and playback method.

The magnetic recording and playback method of the present invention is a magnetic recording and playback method for recording digital data on a magnetic tape by a helical scan method and for playing back digital data recorded on a magnetic tape by a helical scan method, the magnetic recording and playback method comprising the steps of: providing in sequence from the start of each track on a magnetic tape, a first recording area containing an audio sector, etc., and a second recording area containing an insert-and-track-information sector, one of a video sector and an audio-video-mixed sector in which audio data and video data are mixed, a subcode sector, etc., with inter-track gaps provided between the recording areas, and data is recorded continuously on each sector of the first and second recording areas, wherein the data of the first recording area can be rewritten after recording onto the magnetic tape is terminated.

The magnetic recording and playback apparatus of the present invention is a magnetic recording and playback apparatus for recording digital data on a magnetic tape by a helical scan method and for playing back digital data recorded on a magnetic tape by a helical scan method, the magnetic recording and playback apparatus comprising means for providing in sequence from the magnetic tape start of each track on a magnetic tape, a first recording area containing an audio sector, etc., and a second recording area containing an insert-and-track-information sector, one of a video sector and an audio-video-mixed sector in which audio data and video data are mixed, a subcode sector, etc., with inter-track gaps provided between the recording areas, and recording means for recording data continuously on each sector of the first and second recording areas, wherein only the data of the first recording area can be rewritten by the recording means after recording onto the magnetic tape is terminated.

Table 1 below shows the specifications of a method for recording onto and playing back digital data from a magnetic tape having a width of 3.81 mm (=3/20 inches) (hereinafter referred to as "this format"), which is the magnetic recording and playback method of the present invention, and a magnetic recording and playback apparatus employing this format.

TABLE 1

| Item | NTSC & PAL | Item | NTSC & PAL |
|---|---|---|---|
| Diameter of rotating drum | 21.7 mm | Recording density before 8/9 conversion | 1.004 Gbpi² |
| Number of revolutions of rotating drum (1/s) | 100 | Recording density after 8/9 conversion | 1.129 Gbpi² |
| Track/one rotation of rotating drum | 1 | Shortest recording wavelength | 0.28565 µm |
| Rotating drum lead angle | 5.067° | Effective track length | 32.9283 mm |

TABLE 1-continued

| Item | NTSC & PAL | Item | NTSC & PAL |
|---|---|---|---|
| Recording track angle (θr) | 5.07036° | Sync-lag | 6.617 µsec |
| Track pitch | 4 µm | Effective wrap Angle | 174° |
| Tape speed | 4.52596 mm/s | Tape width | 3.81 mm |
| Relative speed | 6.8127 m/s | Tape thickness (90 min) | 5.3 (+0.2/−0.4) µm |
| Recording rate | 47.7 Mbps | | |

Also, a track pattern when a digital signal is recorded on a magnetic tape 1 having a tape width of 3.81 mm, used in this format, is shown in FIG. 1.

As shown in Table 1 above and in Table 2, in this format, a video signal, an audio signal, etc., are recorded on the magnetic tape 1 by rotation of a rotating drum 2 having a diameter of 21.7 mm.

In the rotating drum 2, for example, two magnetic heads whose azimuth angles differ from each other are provided at positions spaced apart by 180°. The two magnetic heads are made to scan at a predetermined angle (θr=5.07036°) with respect to the tape advancing direction of the magnetic tape 1, forming a track pattern such as that shown in FIG. 1. In this format, if a track recorded by one of the magnetic heads is denoted as Tr0 and a track recorded by the other magnetic head is denoted as Tr1, a video signal conforming with the NTSC system or the PAL system is recorded for one frame on a total of four tracks, there being two Tr0 sectors and two Tr1 sectors.

Figure 2:
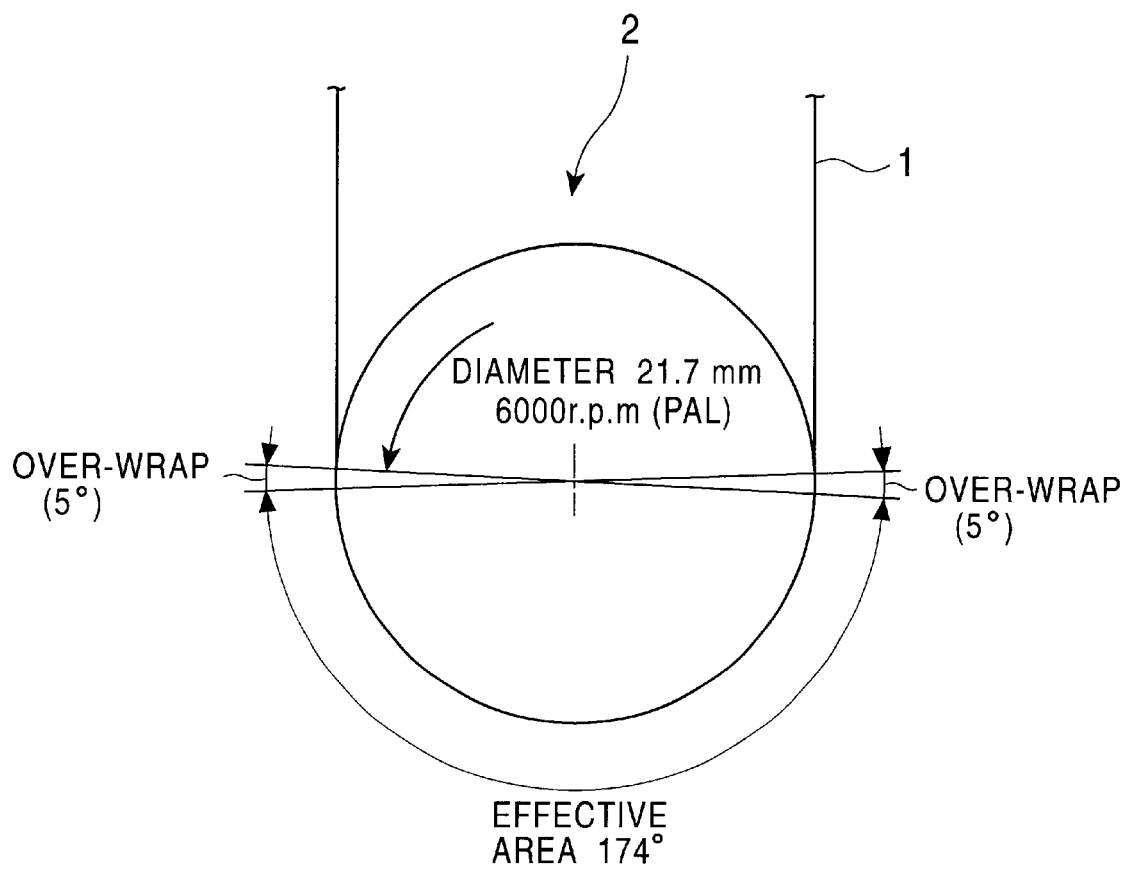
FIG. 2 shows the angle over which a tape is wound around a rotating drum according to the embodiment of the present invention.

FIG. 2 shows an angle at which a tape is wound around a rotating drum in this format.

In this format, as shown in FIG. 2, the magnetic tape 1 is wound around the rotating drum 2 in a range of 174°. A signal which is recorded when one magnetic head is moved in the range of this wrap angle of 174° forms one track on the magnetic tape 1.

During recording of data, each time the rotating drum 2 is rotated by 360°, the head used to record data is switched. That is, for example, at the first rotation of the rotating drum 2, data is recorded on the track Tr0 by one of the heads, and at the next one rotation, data is recorded on the next track Tr1 by the other head having a different azimuth angle.

The playback of data is performed by a double-density playback method (commonly called a "non-tracking" method) in which two heads continuously perform playback operation for each rotation of the rotating drum 2, and each head plays back RF. According to this method, there is an advantage in that since the same track is played back in a slightly varying manner by two heads, the problem of the compatibility due to the curvature of the track can be reduced.

Figure 3:
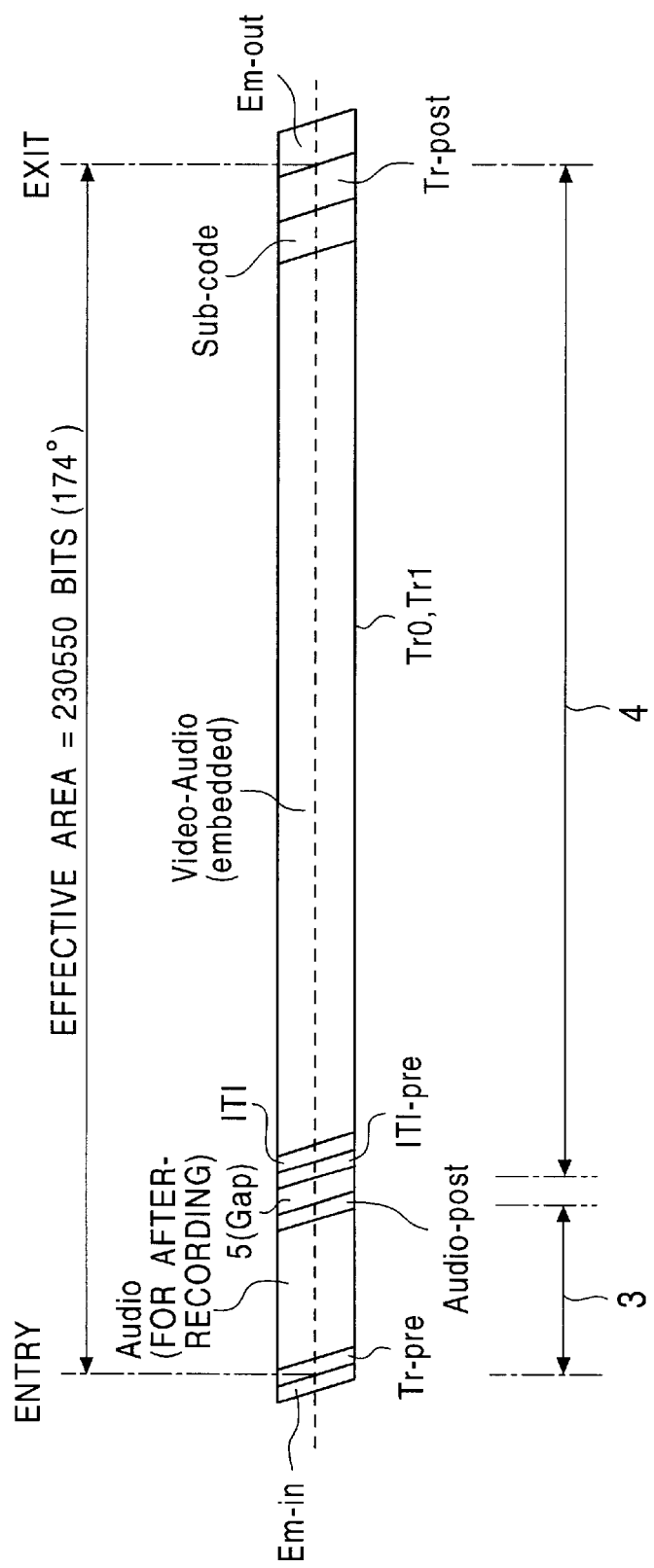
FIG. 3 shows a data pattern on a track according to the embodiment of the present invention.
Figure 4:
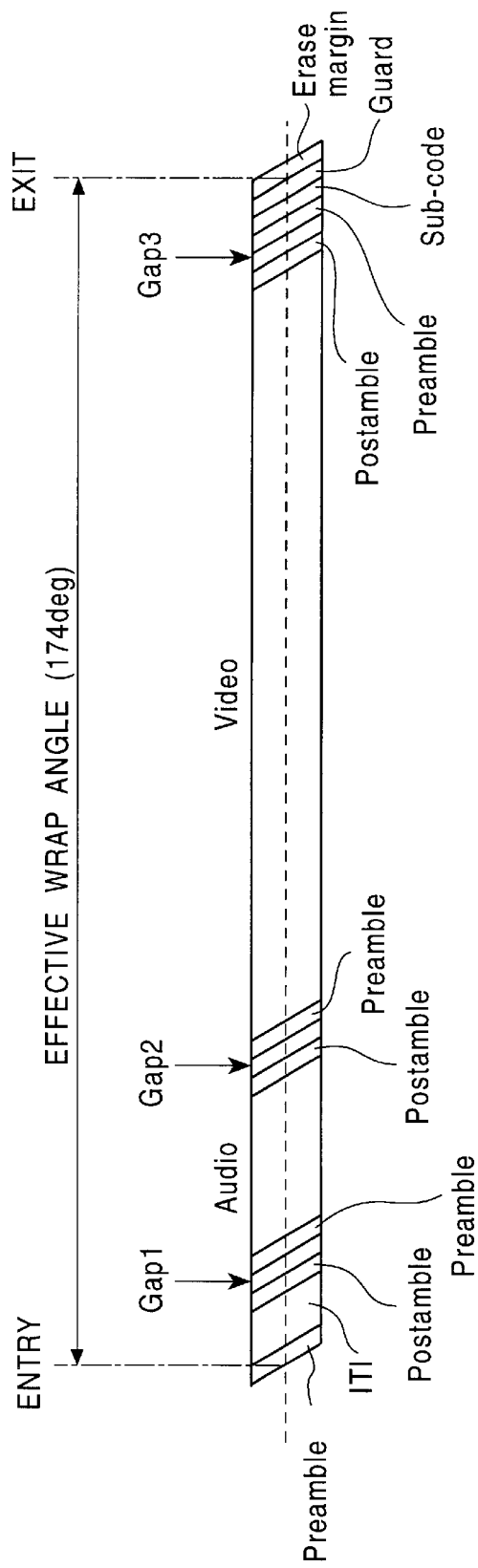
FIG. 4 shows a data pattern in a track in a conventional recording method (DV method).

FIG. 3 shows the data pattern of Tr0 or Tr1 in this format.

More specifically, in this format, the effective wrap angle is 174°, as shown in FIGS. 1 and 3. Within this effective wrap angle, when broadly defined, a first recording area (subarea) 3 of 7.06°, a second recording area (main area) 4 of 166.14°, and an inter-track gap (Gap) 5 of 0.8° therebetween are provided.

Also, at a stage before the effective wrap angle and at a stage after the effective wrap angle, an erase margin-in sector (Em-in) and an erase margin-out sector (Em-out) are located, respectively, as erase margins.

The first recording area 3 is composed of, in sequence from the entry side (i.e., the start) of the head, a track preamble sector (Tr-pre), an audio sector (Audio) for after-recording (After-recording), and an audio postamble sector (Audio-post).

The second recording area 4 is composed of, in sequence from the entry side (i.e., the start) of the head, an ITI preamble sector (ITI-pre), an ITI (insert and track information) sector (ITI), an audio-video-mixed sector (Embedded) sector (Audio-Video) in which video data and audio data are mixed, a subcode sector (Subcode), and a track postamble sector (Tr-post).

Table 2 shows details of sectors which are constituents of the first recording area 3 and the second recording area 4, the bit structure of the inter-track gap 5, etc.

TABLE 2

| Sector | Number of bits (bits) | Angle (deg) | Time (μsec) | Recording current Over-Write | Recording current After Rec. |
|---|---|---|---|---|---|
| (Erase margin-in) | (1197) | (0.90) | (25.09) | ○ | |
| Track preamble | 1494 | 1.13 | 31.32 | ○ | ○ |
| Audio (After Rec.) | 7056 | 5.33 | 147.92 | ○ | ○ |
| Audio postamble | 792 | 0.60 | 16.60 | ○ | ○ |
| Gap | 1062 | 0.80 | 22.26 | ○ | |
| ITI preamble | 243 | 0.18 | 5.09 | ○ | |
| ITI | 1008 | 0.76 | 21.13 | ○ | |
| Audio-video (Embedded) | 215712 | 162.80 | 4522.26 | ○ | |
| Subcode | 1296 | 0.98 | 27.17 | ○ | |
| Track postamble | 1887 | 1.42 | 39.56 | ○ | |
| (Erase margin-out) | (2655) | (2.00) | (55.66) | ○ | |

○: OK

As shown in FIG. 3 and in Table 2 above, the track pattern of the magnetic tape 1, when the location of the main sectors thereof is seen, has a structure in which, from the entry side of the head, an inter-track gap (Gap) 5 of 1062 bits is located after the audio sector (Audio) of 7056 bits and the audio postamble sector of 792 bits, an ITI preamble sector of 243 bits and an insert-and-track-information sector (ITI) of 1008 bits are located before an audio-video-mixed sector (Audio-Video) of 215712 bits, and a subcode sector (Subcode) of 1296 bits is located after the audio-video-mixed sector (Audio-Video).

In the manner as described above, the track pattern of the magnetic tape 1 has a structure in which, for example, the inter-track gap 5 which is not actually used to record data is not provided in the other portions, such as the section between the audio-video-mixed sector (Audio-Video) and the subcode sector (Subcode), and is provided only in the one portion described above.

Therefore, the ratio of the inter-track gap 5 occupied in the effective data area of one track, that is, track preamble sector (Tr-pre)+audio sector (Audio)+audio postamble sector (Audio-post)+inter-track gap 5+ITI preamble sector (ITI-pre)+insert-and-track-information sector (ITI)+audio-video-mixed sector (Audio-Video)+subcode sector (Subcode)+track postamble sector (Tr-post), is approximately 0.5% (1062/230550, which is approximately equal to 0.005). This ratio is 0.5%, whereas the conventional DV method had a wasted area of approximately 2%, thereby yielding an improvement of 1.5%.

In this format, the structure described below is adopted to minimize the ratio of the inter-track gap which is not an effective data area within one track.

More specifically, the insert-and-track-information sector (ITI) which is a time-axis reference during after-recording onto the audio sector (Audio) is provided in a side after the audio sector (Audio) so that the timing obtained at the previous head scan is stored and accumulated in order to measure the timing for the after-recording onto the audio sector (Audio). For this reason, it is not necessary to locate an inter-track gap in a section from the insert-and-track-information sector (ITI) to the audio-video-mixed sector (Audio-Video).

Furthermore, in this format, the subcode sector (Subcode) is not made an object for after-recording, and a time code at the initial data recording time and additional data are recorded to indicate the location, etc., during a search, and for a marker for rewriting at a later time, for example, a memory, etc., is provided in a cassette of the magnetic tape 1. For this reason, it is possible to eliminate the inter-track gap between the audio-video-mixed sector (Audio-Video) and the subcode sector (Subcode).

In addition, since the subcode sector (Subcode) must also be read during high-speed movement of the magnetic tape 1, such as in a search, the subcode sector is located at the exit side of the head of the track, in which the air film between the tape and the rotating drum 2 is small and the RF output is stable even during high-speed movement.

In addition, the audio sector (Audio) for after-recording is located in the entry side of the head of the track, in which RF output is likely to become unstable during a search. The reason for this is that there is no need to output audio during a search.

The reason an erase margin-in sector (Em-in) and an erase margin-out sector (Em-out) are provided at a stage before and after the effective wrap angle, that is, at the entry and at the exit of the head of the track, is to prevent previous data from remaining due to misalignment of a track when over-writing on a recorded track.

As has thus been described, in the magnetic recording and playback method and apparatus of the present invention, since an inter-track gap, which is an unused data area within the track, can be reduced, the ratio of the inter-track gap occupied in all the data recording area becomes approximately 0.5%, and in comparison with the conventional DV method in which the ratio thereof is approximately 2%, 1.5% more data can be recorded.

Therefore, if the amounts of data to be recorded were the same, it is possible to reduce the amount of magnetic tape used. In addition, if the amounts of magnetic tape used were the same, it is possible to increase the amount of data recorded thereon, making it possible to improve audio quality and image quality.

In addition, if the amounts of magnetic tape used were the same, the frequency of recorded data signals can be decreased and the shortest recording wavelength recorded on a magnetic tape can be lengthened, also making it possible to reduce the burden on the magnetic tape and on an electromagnetic conversion system such as a magnetic head.

The location sequence of each sector which is a constituent of a data pattern of the track of this format and the inter-track gap 5 are not limited to the above-described example. That is, the present invention is directed to minimizing the ratio of the inter-track gap occupied in each track of the magnetic tape in order to increase the effective amount of data which can be recorded on one track. Therefore, as long as this object can be achieved, the location sequence of each sector which is a constituent of a data pattern of a track may be altered as necessary.

Also, the specific shape and construction of each section described in the above-described embodiments are merely examples of the present invention, and it is to be understood that the technical scope of the present invention should not be construed to be limited thereby.

As is clear from the foregoing description, in the magnetic recording and playback method for recording digital data on a magnetic tape by a helical scan method and for playing back digital data recorded on a magnetic tape by a helical scan method, in sequence from the start on each track on a magnetic tape, a first recording area containing an audio sector, etc., and a second recording area containing an insert-and-track-information sector, one of a video sector and an audio-video-mixed sector in which audio data and video data are mixed, a subcode sector, etc., are located, with an inter-track gap provided between the recording areas, data is continuously recorded on each sector of the first recording area and the second recording area, and the data of the first recording area can be rewritten after recording onto the magnetic tape is terminated. Thus, since data is written continuously on each sector of the first recording area and the second recording area, wasted portions which would not be used to record data on each track are reduced, making it possible to improve the use efficiency of the magnetic tape and to effectively use the first recording area for after-recording purposes for audio.

Also, the magnetic recording and playback apparatus for recording digital data on a magnetic tape by a helical scan method and for playing back digital data recorded on a magnetic tape by a helical scan method comprises means for providing a first recording area containing an audio sector, etc., and a second recording area containing an insert-and-track-information sector, one of a video sector and an audio-video-mixed sector in which audio data and video data are mixed, a subcode sector, etc., with an inter-track gap provided between the recording areas, and recording means for recording data continuously on each sector of the first and second recording areas, wherein only the data in the first recording area can be rewritten after recording onto the magnetic tape is terminated. Thus, since data is written continuously on each sector of the first recording area and the second recording area, wasted portions which would not be used to record data on each track are reduced, making it possible to improve the use efficiency of the magnetic tape and to effectively use the first recording area for after-recording purposes for audio.

According to the present invention, in the second recording area, since an insert-and-track-information sector, one of a video sector and an audio-video-mixed sector, or a subcode sector are located immediately after an adjacent inter-track gap, it becomes unnecessary to provide an inter-track gap which would be a wasted portion which would not be used to record data, making it possible to further improve the use efficiency of the magnetic tape.

According to the present invention, in the second recording area, since an insert-and-track-information sector is located immediately after an adjacent inter-track gap, and one of a video sector and an audio-video-mixed sector, or a subcode sector are located immediately thereafter, it becomes unnecessary to provide an inter-track gap which would be a wasted portion which would not be used to record data, making it possible to further improve the use efficiency of the magnetic tape.

According to the present invention, in the second recording area, since an insert-and-track-information sector, and one of a video sector and an audio-video-mixed sector are located immediately after an adjacent inter-track gap, and a subcode sector is located immediately after the sectors, it becomes unnecessary to provide an inter-track gap which would be a wasted portion which would not be used to record data, making it possible to further improve the use efficiency of the magnetic tape.

According to the present invention, in the second recording area, since an insert-and-track-information sector, one of a video sector and an audio-video-mixed sector, and a subcode sector are located in this sequence immediately after an adjacent inter-track gap, it becomes unnecessary to provide, between the sectors, an inter-track gap which would be a wasted portion which would not be used to record data, making it possible to further improve the use efficiency of the magnetic tape, and since the subcode sector track is located on the exit side of the magnetic head, it is possible to stabilize the output thereof.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A magnetic recording and playback method for recording digital data on a magnetic tape by a helical scan method and for playing back digital data recorded on a magnetic tape by a helical scan method, said magnetic recording and playback method comprising the steps of:

providing in sequence on each track on a magnetic tape a first recording area containing at least an audio sector, and a second recording area containing at least an insert-and-track-information sector, one of a video sector and an audio-video-mixed sector, and a subcode sector, an inter-track gap provided between the recording areas; and recording data continuously on each sector of the first and second recording areas,
wherein the data in the first recording area can be rewritten after recording onto the magnetic tape is terminated.

2. A magnetic recording and playback method according to claim 1, wherein in the second recording area, at least one of an insert-and-track-information sector, one of a video sector and an audio-video-mixed sector, and a subcode sector is located immediately after an adjacent inter-track gap.

3. A magnetic recording and playback method according to claim 1, wherein in the second recording area, an insert-and-track-information sector is located immediately after an adjacent inter-track gap, and one of (i) a video sector and a subcode sector and (ii) an audio-video-mixed sector and a subcode sector is located immediately thereafter.

4. A magnetic recording and playback method according to claim 1, wherein in the second recording area, one of (i) an insert-and-track-information sector and (ii) one of a video sector and an audio-video-mixed sector is located immediately after an adjacent inter-track gap, and a subcode sector is located immediately after the above sectors.

5. A magnetic recording and playback method according to claim 1, wherein in the second recording area, an insert-and-track-information sector, one of a video sector and an audio-video-mixed sector, and a subcode sector are continuous after an adjacent inter-track gap.

6. A magnetic recording and playback apparatus for recording digital data on a magnetic tape by a helical scan method and for playing back digital data recorded on a magnetic tape by a helical scan method, said magnetic recording and playback apparatus comprising:

means for providing in sequence on each track on a magnetic tape a first recording area containing at least an audio sector, and a second recording area containing at least an insert-and-track-information sector, one of a video sector and an audio-video-mixed sector, and a subcode sector, an inter-track gap provided between the recording areas; and recording means for recording data continuously on each sector of the first and second recording areas, wherein only the data in the first recording area can be rewritten by said recording means after recording onto the magnetic tape is terminated.

7. A magnetic recording and playback apparatus according to claim 6, wherein in the second recording area, at least one of an insert-and-track-information sector, one of a video sector and an audio-video-mixed sector, and a subcode sector is located immediately after an adjacent inter-track gap.

8. A magnetic recording and playback apparatus according to claim 6, wherein in the second recording area, an insert-and-track-information sector is located immediately after an adjacent inter-track gap, and one of (i) a video sector and a subcode sector and (ii) an audio-video-mixed sector and a subcode sector is continuously located immediately thereafter.

9. A magnetic recording and playback apparatus according to claim 6, wherein in the second recording area, one of (i) an insert-and-track-information sector and (ii) one of a video sector and an audio-video-mixed sector is located immediately after an adjacent inter-track gap, and a subcode sector is located immediately after the above sectors.

10. A magnetic recording and playback apparatus according to claim 6, wherein in the second recording area, an insert-and-track-information sector, one of a video sector and an audio-video-mixed sector, and a subcode sector are continuous after an adjacent inter-track gap.

* * * * *